(12) United States Patent
Narasimha et al.

(10) Patent No.: US 8,937,963 B1
(45) Date of Patent: Jan. 20, 2015

(54) INTEGRATED ADAPTIVE JITTER BUFFER (75) Inventors: Madihally J. Narasimha, Saratoga, CA (US); Lu Chang, Sunnyvale, CA (US)

(73) Assignee: Pico Mobile Networks, Inc., Sunnyvale, CA (US)

( * ) Notice: Subject to any disclaimer, the term of this patent is extended or adjusted under 35 U.S.C. 154(b) by 321 days.

(21) Appl. No.: 13/613,541

(22) Filed: Sep. 13, 2012

Related U.S. Application Data (63) Continuation of application No. 11/764,790, filed on Jun. 18, 2007, now Pat. No. 8,279,884.

(60) Provisional application No. 60/680,673, filed on Nov. 21, 2006.

(51) Int. Cl.
*H04L 12/56* (2006.01)

(52) U.S. Cl.
USPC ............ 370/412; 370/410; 370/516; 370/519

(58) Field of Classification Search
USPC .................................. 370/410, 412, 516, 519
See application file for complete search history.

(56) References Cited

U.S. PATENT DOCUMENTS

| | | | |
|---|---|---|---|
| 5,735,583 A | 4/1998 | Katayama et al. | |
| 5,738,583 A | 4/1998 | Comas et al. | |
| 6,272,120 B1 | 8/2001 | Alexander | |
| 6,287,200 B1 | 9/2001 | Sharma | |
| 6,600,726 B1 | 7/2003 | Nevo et al. | |
| 6,690,935 B1 | 2/2004 | Calot et al. | |
| 6,704,866 B1 | 3/2004 | Benayoun et al. | |
| 6,707,801 B2 | 3/2004 | Hsu | |
| 6,760,587 B2 | 7/2004 | Holtzman et al. | |
| 6,785,592 B1 | 8/2004 | Smith et al. | |
| 6,785,892 B1 | 8/2004 | Miller | |
| 6,788,675 B1 | 9/2004 | Yang | |
| 6,793,580 B2 | 9/2004 | Sinclair et al. | |
| 6,795,701 B1 | 9/2004 | Baker et al. | |
| 6,799,056 B2 | 9/2004 | Curley et al. | |
| 6,859,460 B1 * | 2/2005 | Chen ............................. 370/412 | |
| 6,879,574 B2 | 4/2005 | Naghian et al. | |
| 6,879,812 B2 | 4/2005 | Agrawal et al. | |
| 6,909,705 B1 | 6/2005 | Lee et al. | |
| 6,932,698 B2 | 8/2005 | Sprogis | |
| 6,973,580 B1 | 12/2005 | Carroll et al. | |
| 7,013,391 B2 | 3/2006 | Herle et al. | |
| 7,072,323 B2 | 7/2006 | Roberts et al. | |

(Continued)

OTHER PUBLICATIONS

IEEE Standards Board.IEEE 802.11 Standard, 1999. 1999 Edition (R2003).

(Continued)

*Primary Examiner* — Kenny Lin (57) ABSTRACT

A system is provided and includes a buffer, an interface, a processor, and an output device. The interface is configured to receive a packet from a network. The processor is configured to: determine a delay of the network in transmitting the packet; prior to storing the packet in the buffer, determine statistics of the buffer, and an amount the buffer is filled; determine a predetermined delay of the buffer based on the delay of the network, and the statistics; estimate an actual delay of the buffer for the packet based on the amount the buffer is filled; generate an error signal based on the predetermined delay and the actual delay; and based on the error signal, one of compress and expand the packet to change a first length of the packet to a second length. The output device is configured to output the packet based on the second length.

20 Claims, 7 Drawing Sheets

(56) References Cited

U.S. PATENT DOCUMENTS

| | | |
|---|---|---|
| 7,073,129 B1 | 7/2006 | Robarts et al. |
| 7,085,257 B1 | 8/2006 | Karves et al. |
| 7,087,562 B2 | 8/2006 | Abe et al. |
| 7,097,562 B2 | 8/2006 | Gagner |
| 7,143,171 B2 | 11/2006 | Eriksson et al. |
| 7,181,544 B2 | 2/2007 | Vangal et al. |
| 7,224,964 B2 | 5/2007 | Souissi et al. |
| 7,236,772 B1 | 6/2007 | Botzas |
| 7,251,235 B2 | 7/2007 | Wentink |
| 7,308,263 B2 | 12/2007 | Gallagher et al. |
| 7,324,444 B1 | 1/2008 | Liang et al. |
| 7,400,722 B2 | 7/2008 | Qi et al. |
| 7,435,179 B1 | 10/2008 | Ford |
| 7,440,430 B1 * | 10/2008 | Jagadeesan et al. .......... 370/331 |
| 7,452,278 B2 | 11/2008 | Chen et al. |
| 7,710,982 B2 * | 5/2010 | Ohmuro et al. .......... 370/395.64 |
| 7,817,545 B2 * | 10/2010 | Ho et al. ................ 370/231 |
| 7,881,284 B2 * | 2/2011 | Lin et al. ................ 370/352 |
| 7,970,384 B1 | 6/2011 | Lambert et al. |
| 8,374,584 B1 | 2/2013 | Lambert et al. |
| 2002/0087370 A1 * | 7/2002 | Brueckheimer et al. .......... 705/7 |
| 2002/0151366 A1 | 10/2002 | Walker et al. |
| 2002/0152388 A1 | 10/2002 | Linnartz et al. |
| 2002/0191560 A1 | 12/2002 | Chen et al. |
| 2002/0199124 A1 | 12/2002 | Adkisson |
| 2003/0069018 A1 | 4/2003 | Matta et al. |
| 2003/0088690 A1 * | 5/2003 | Zuckerman et al. .......... 709/232 |
| 2003/0115320 A1 * | 6/2003 | Yarroll et al. ................ 709/224 |
| 2003/0152093 A1 * | 8/2003 | Gupta et al. ................ 370/412 |
| 2003/0169755 A1 * | 9/2003 | Ternovsky ................ 370/412 |
| 2003/0182454 A1 | 9/2003 | Huth et al. |
| 2003/0224855 A1 | 12/2003 | Cunningham |
| 2003/0231189 A1 | 12/2003 | Williams |
| 2003/0231625 A1 | 12/2003 | Calvignac |
| 2004/0066751 A1 | 4/2004 | Tseng et al. |
| 2004/0081106 A1 * | 4/2004 | Bruhn ................ 370/276 |
| 2004/0082383 A1 | 4/2004 | Muncaster et al. |
| 2004/0105415 A1 | 6/2004 | Fujiwara et al. |
| 2004/0120309 A1 * | 6/2004 | Kurittu et al. ................ 370/352 |
| 2004/0127277 A1 | 7/2004 | Walker et al. |
| 2004/0174829 A1 | 9/2004 | Ayyagari |
| 2004/0185851 A1 | 9/2004 | Nagai |
| 2004/0196808 A1 | 10/2004 | Chaskar et al. |
| 2004/0236850 A1 | 11/2004 | Krumm et al. |
| 2005/0025163 A1 | 2/2005 | Christie |
| 2005/0032577 A1 | 2/2005 | Blackburn et al. |
| 2005/0041660 A1 | 2/2005 | Pennec et al. |
| 2005/0041793 A1 | 2/2005 | Fulton et al. |
| 2005/0041796 A1 | 2/2005 | Joseph et al. |
| 2005/0073980 A1 | 4/2005 | Thomson et al. |
| 2005/0079873 A1 | 4/2005 | Caspi et al. |
| 2005/0099977 A1 | 5/2005 | Williams et al. |
| 2005/0157661 A1 | 7/2005 | Cho |
| 2005/0177639 A1 | 8/2005 | Reunamaki et al. |
| 2005/0181872 A1 | 8/2005 | Acharya et al. |
| 2005/0197189 A1 | 9/2005 | Schultz |
| 2005/0207342 A1 * | 9/2005 | Tanabe et al. ................ 370/235 |
| 2005/0250487 A1 | 11/2005 | Miwa et al. |
| 2005/0250497 A1 | 11/2005 | Ghosh et al. |
| 2005/0268003 A1 | 12/2005 | Wang et al. |
| 2005/0286456 A1 | 12/2005 | McNew et al. |
| 2006/0041750 A1 | 2/2006 | Carter et al. |
| 2006/0045138 A1 | 3/2006 | Black et al. |
| 2006/0046709 A1 | 3/2006 | Krumm et al. |
| 2006/0063539 A1 | 3/2006 | Beyer |
| 2006/0135262 A1 | 6/2006 | Kennedy et al. |
| 2006/0166740 A1 | 7/2006 | Sufuentes |
| 2006/0172736 A1 | 8/2006 | Nevo |
| 2006/0205409 A1 | 9/2006 | Chiou et al. |
| 2006/0221857 A1 | 10/2006 | Bushnell et al. |
| 2006/0268711 A1 | 11/2006 | Doradla et al. |
| 2007/0026866 A1 | 2/2007 | Krishnamurthi et al. |
| 2007/0035513 A1 | 2/2007 | Sherrard et al. |
| 2007/0047547 A1 | 3/2007 | Conner et al. |
| 2007/0047697 A1 | 3/2007 | Drewry et al. |
| 2007/0060355 A1 | 3/2007 | Amaitis et al. |
| 2007/0060358 A1 | 3/2007 | Amaitis et al. |
| 2007/0076683 A1 | 4/2007 | Chung |
| 2007/0082671 A1 | 4/2007 | Feng et al. |
| 2007/0086394 A1 | 4/2007 | Yamada et al. |
| 2007/0099703 A1 | 5/2007 | Terebilo |
| 2007/0197237 A1 | 8/2007 | Powell et al. |
| 2007/0202910 A1 | 8/2007 | Brewer et al. |
| 2008/0039015 A1 | 2/2008 | Nakata et al. |
| 2008/0069105 A1 | 3/2008 | Costa et al. |
| 2008/0082671 A1 | 4/2008 | Meijer et al. |
| 2008/0095112 A1 | 4/2008 | Wiemann et al. |
| 2008/0123608 A1 | 5/2008 | Edge et al. |
| 2008/0228547 A1 | 9/2008 | Doss et al. |
| 2009/0191878 A1 | 7/2009 | Hedqvist et al. |
| 2009/0222358 A1 | 9/2009 | Bednarek |
| 2010/0093374 A1 | 4/2010 | Dacosta |
| 2010/0285776 A1 | 11/2010 | de Froment |
| 2011/0066485 A1 | 3/2011 | Rissanen |
| 2011/0093876 A1 | 4/2011 | Belz et al. |
| 2012/0095844 A1 | 4/2012 | Barnes, Jr. |
| 2012/0106728 A1 | 5/2012 | Ghaffari et al. |
| 2013/0096966 A1 | 4/2013 | Barnes, Jr. |

OTHER PUBLICATIONS

Newton, Harry. Newton's Telecom Dictionary. 15th Edition. Miller Freeman Inc., 1999. 762. (3 pages).

"Universal Mobile Access: UMA Expands Beyond Dual-Mode Handsets"; The UMA Company; Jan. 2007; 8 pages.

Meredith, John; "Voice Call Continuity in 3GPP"; CompactPCI and Advanced TCA Systems; Apr. 2006; 2 pages.

* cited by examiner

All time variables are absolute times referenced to receiver clock using speech sample (125 µs) as the time unit $t_k$: Packet emission time  $\quad p_k = t_k + d_k$
$a_k$: Packet arrival time  $\quad\quad d_k = n_k + b_k$
$p_k$: Packet playout time  $\quad\;\; n_k = a_k - t_k$ Let
$s_k$ = Sender time stamp of the received RTP packet
$C_k$ = Clock offset between sender and receiver
$N_k$ = Pseudo network delay taking into account the clock offset Then
$t_k = s_k + C_k$, and
$N_k = n_k + C_k = a_k - s_k$

INTEGRATED ADAPTIVE JITTER BUFFER

CROSS-REFERENCE TO RELATED APPLICATIONS

This application is a Continuation of U.S. patent application Ser. No. 11/764,790 filed on Jun. 18, 2007, which claims the benefit of U.S. Provisional Application No. 60/680,673 filed on Nov. 21, 2006. The entire disclosures of the above applications are incorporated herein by reference.

FIELD

The present disclosure relates to jitter correction in packet networks.

BACKGROUND

Packet networks transmit media content whose playout is time sensitive. It is well known that packets representing portions of real time conversation or similar data streams traveling through computer networks experience substantial delays or other signal interference sufficient for perception of a break in playout by a human experiencing reception of the data stream.

Packet delay has two effects, i.e., delay in an absolute sense can interfere with the rhythm of interaction either between humans in conversation or with machine interaction; and delay variations, also known as jitter, can create unexpected pauses that may impair the intelligibility of the data stream. In a specific example, the quality of a packetized voice delivered to a client computer or network destination could be perceived as "jerky" or discontinuous at sense-critical moments.

Jitter, the more serious of these problems, is the difference between when a packet is expected to arrive and when it actually is received. Jitter is due primarily to queuing delays and congestion in the packet network, which cause discontinuity in delivery of packets of the real-time data stream.

Time-sensitive data streams need a steady, even stream of packets to reproduce human or machine input from the other end for optimal human perception and interaction. Humans may obtain the logical sense of a broken up playout while experiencing such extensive frustration that focus on the playout is diminished, effectively losing the value of intelligible content delivered to a human receiver. Delivery of voice packets is often irregular because conditions in the network are always changing. During congested periods, buffers on a network can fill instantaneously, delaying some packets until there is room for them on the network. Other packets in the same data stream may not be delayed, because there was no congestion when they passed over the network. Thus, various packets in the same data stream can experience different amounts of inter-arrival variance, or jitter, which is a variable component of the total end-to-end network delay.

Some packet networks compensate for jitter by setting up a buffer, called the jitter buffer, on a gateway router at the receiving end of the voice transmission to be buffered and as close, at the physical layer, to the playout devices of the receiving human. It is well known that an IP network can use a jitter buffer to receive packets at irregular intervals, which are sometimes out of sequence so that the jitter buffer holds the packets briefly, reorders them if necessary, and then plays them out at evenly spaced intervals to a decoder in a Digital Signal Processor (DSP) on the gateway. Algorithms in the DSP determine the size and behavior of the jitter buffer, based on user configuration and current network jitter conditions, to maximize the number of correctly delivered packets and minimize the amount of delay. Adaptive jitter buffers are well known in the art to include simple or complex algorithms to handle playout to optimize human comprehension and enjoyment.

It is also well known in the prior art that packet length is unaffected by jitter buffer 30 manipulation, i.e., that the jitter buffer acts to organize the packet population retained in the buffer for prior to release to playout devices but that the packet length is scrupulously maintained to preserve playout integrity. There is a need for a system which alters the relationship between prior art jitter buffers and ultimate playout to further improve delivery of real time data streams to a human recipient.

Even in the absence of network jitter, buffer overflows or underflows, known as slips, occur at the receiver if its clock is not synchronized to the transmitter clock, due to the fact that the read and write rates at the receive buffer will not identical. A slip results in the distortion of the played out speech. Assuming a circular buffer design, it causes a speech segment, equal in duration to that of the buffer, to be deleted if the read clock is slower than the write clock, or to be repeated if it is faster. A further consequence of this clock skew is that the buffer delay in the receiver varies from zero to the maximum capacity of the buffer even though the network has a constant propagation delay. This implies that the playout delay, which should be constant in a jitter-free network, will also have an identical variation.

It is generally difficult to estimate this clock skew and convert the sampling rate of the received stream to a new rate to account for the skew. Hence there is a need for an integrated adaptive jitter buffer in modern Voice-over-Internet-Protocol (VoIP) systems, where both the network jitter and the clock skew problems are simultaneously solved, thereby providing a better subjective voice quality for the communicating parties.

SUMMARY

A system is provided and includes an input/output interface that receives a sequence of packets from a media source over a packet network. A control device stores the sequence of packets in a jitter buffer, determines a first set of statistics of the jitter buffer prior to storing the sequence of packets in the jitter buffer, and generates a first signal output including the sequence of packets based on the first set of statistics. A decoder receives the first signal output, and decodes packet data of the first signal output to generate a second signal output.

The second signal output includes a silence period based on the first signal output. The silence period is between a leading waveform and a trailing waveform. A signal processing device receives the second signal output, samples at least one of the leading waveform and the trailing waveform to generate an expansion block, fills the silence period with the expansion block to generate an expanded output, and samples at least one of the leading waveform and the trailing waveform to generate a compressed block and a compressed output based on the second signal output. A transmitter transmits one of the expanded output and the compressed output from a playout buffer.

A technique is disclosed herein and includes generating a continuous real time data stream from input of media content from a media source including packets transmitted by way of a computer packet network to a jitter buffer. The jitter buffer receives real time data stream packets from the packet network and temporarily storing at least some of them in the jitter buffer. The jitter buffer operates on multiple fixed length packets to output a first output of a predetermined sequence of the fixed length packets, substantially as they were originally transmitted. A control unit receives the first output and changes the length of one or more of the fixed length packets of the first output to form a second output in response to a detected delay variation or other discontinuity in the packet sequence, or the change in fill level of the jitter buffer. A playout buffer receives the second output and operates on the stream of original and varied length packets to deliver them to a digital to analog converter (DAC). Transmission of analog output of the DAC to interface devices such as displays, speakers, and mechanical devices for intelligible playout of the media content for appreciation by a human interacting with the interface devices.

In other features, the above steps represent a voice as the media content input to a cellular phone device, where the voice stream is converted to a digital signal stream, the digital signal stream is converted to fixed length packets and transmitted by way of a packet network to a recipient of a phone call. In this specific example, the human recipient appreciates a substantially improved quality of service by playout of variable length packets delivered from the control unit to the playout buffer. The system is capable of retrofitting existing systems having well known or proprietary jitter buffers. The control unit of the system receives output of fixed length packets from prior art jitter buffers or those of the system for varying the length of at least one of the fixed length packets input to the control unit. Network adaptive algorithms for reception, storage and output of packets in a jitter buffer can be based on well-known network delay statistics and metrics. The intelligibility of playout of a packet stream delivered to the jitter buffer on is further improved by further operation of a control unit and subsequent operation on its output by a playout buffer.

Improvement in playout quality results from adjustment of packet length at the control unit. Gaps or breaks are substantially eliminated. Compression of packets permits reduction of playback time when acceleration of packet arrival causes undue accumulation of packets at the jitter buffer, and the prevention of buffer overflows when the receiver clock is slower than the transmitter clock. Expansion of packets permits bridging of gaps due to packet loss, and avoiding buffer underflows if the receiver clock is too fast. One of a number of time scale modification algorithms can be employed to perform the necessary signal expansion or compression.

One other distinguishing feature of the control unit is that it not only computes the network delay and jitter statistics that are used to determine the desired buffer delay for a specific speech packet, as many prior-art systems do, but it also estimates the actual buffer delay for that packet based on the buffer occupancy at the time the packet arrives, and then computes an error signal that represents the difference between the two. It then applies the appropriate time scale modification (compression or expansion) to the played out speech packet so that the abovementioned difference is driven towards zero. This yields a closed loop servo system that is very agile and is far superior to prior-art systems, which are normally configured to operate in the open-loop mode.

A human may receive a media stream involving hearing (as in a telephone call), sight (as in a video stream), or touch (as in remote transmission of a surgeon's motion in surgical procedures). In each of these instances, continuous playout of a media stream is critical to heuristics of satisfactory human sensation or experience.

In a specific and simple example, jitter buffers are known to incorporate a predetermined delay in initiation of distribution of packets to playout in anticipation of normal network delays. In such a case, fewer actual delays are experienced by a human recipient of the media stream at the cost of an initial accumulation of packets at the jitter buffer. Unanticipated acceleration of receipt of packets from the network can cause potential overflow or congestion in handling contents of the jitter buffer. Unanticipated slowdown in receipt of packets from the network introduces unavoidable starvation of the buffer that will force unnatural gaps in the played out speech. In either of the cases of unanticipated acceleration or slowdown of the network transmissions, adaptive algorithms based on network metrics cannot respond with sufficient precision to avoid all breaks in playout of the media content.

In other features, elimination of unnatural breaks or gaps in packet playout by way of introduction of a control unit function intervening between a jitter buffer and playout devices is provided, where the control unit function performs signal expansion to fill the gap or break or starvation of the buffer.

In other features, signal compression for packets from a jitter buffer is provided for accelerated playout in order to prevent buffer overflows or undue playout delays.

In other features, signal expansion or compression of packet signals of jitter buffer output is provided by way of a closed-loop control unit function in a manner that closely matches psychological expectations of a human recipient as to discontinuities of media content resulting from network jitter and/or clock offset between the transmitter and the receiver.

BRIEF DESCRIPTION OF DRAWINGS

FIG. 8 is an alternate high level block diagram of the system.

DESCRIPTION

Figure 1:
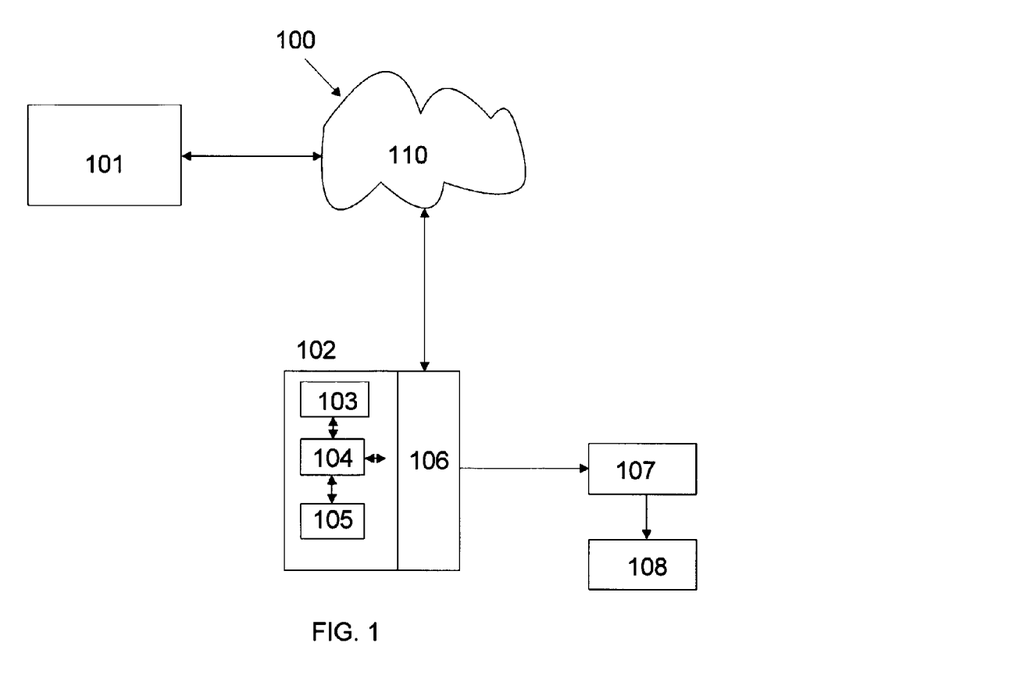
FIG. 1 is a high level block diagram of the system.

FIG. 1 is a block diagram illustrating a communication system 100 including a transmitting media source 101 which transmits packetized real time media content via a packet network 110 to a node 102. Node 102 includes a microprocessor having a CPU 103, memory 104, real time clock 105, and input/output means 106, where memory 104 contains a control program including functions for performing the functions of a jitter buffer, a control unit and a playback buffer. Output created by operation of the playback buffer function is transmitted to digital to analog converter 107, which in turn is output to a human recipient of the media content by way of interface devices 108.

Node 102 may include a cellular phone, a SIP device, a personal computer, or any other such well known wire-connected or wireless devices for receiving packetized media streams from a packet network such as the Internet or other IP networks. Source 101 may also include wired or wireless devices for receiving input of analog or digital signals and delivering a stream of digital media signals in packet form to the packet network 110. Node 102 may include a gateway router.

Media source 101 and node 102 may include session initiation protocol (SIP) devices, i.e., a SIP phone, such as those commercially available. Communication between the SIP phones is enabled by intervening routers and may be provided via the Internet or over a wide area network (WAN) or local area network (LAN). Also, the Internet may instead be a data network domain. It should be noted that additional session routers and media routers may be provided within the communication network 110. In fact, communication from a first media router may be to a second media router, a session router, a SIP device, and/or a non-SIP device located in a LAN, WAN, or other location.

Memory 104 temporarily stores received media content packets. In addition, the control program operates to acquire network statistics such as latency, jitter and packet loss for a pre-defined window of time. It should be noted that the jitter window is pre-defined or is adaptively changed. Aggregate statistics may include transmitted packets, ropped packets and/or duplicate packets. Minimum and maximum statistics, otherwise referred to as "boundary statistics," may also be collected which may include latency, jitter and packet loss per window of time. The system is also capable of detection and correction of upstream and/or downstream failures in the transmission of real time protocol (RTP) data packets, using information such as link failures and external management events.

Jitter is a measurement of the variation of the gap between packets on a flow. An alternative definition is that jitter is the variance in latency for a sequence of media packets. Node 102 can measure jitter for an RTP data flow. The time gap between packet receipt is added to an aggregate to maintain a "mean" jitter value. The "mean" jitter value can also be compared to a min/max value in a flow record to determine if a new min/max jitter value is established. A jitter window is typically implemented in voice gateways to compensate for fluctuating network conditions. The jitter window is a packet buffer that holds incoming packets for a specified amount of time, before forwarding them for decompression. These are well known compression and decompression standards used for jitter windows.

Figure 2:
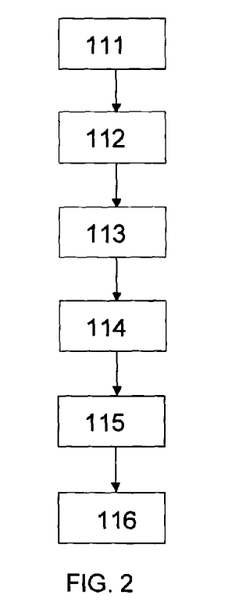
FIG. 2 is an alternate high level block diagram of the system.

FIG. 2 shows block diagrams of functions of the system of FIG. 1, wherein media content device 111 transmits packets of media content via packet network 112 to, in sequence, jitter buffer 113, control unit 114, playout buffer 115 and playout means 116. Media content packets are a specific sequence of data packets which must be played out in that same sequence by playout means 116 for perception by a human recipient.

Jitter buffer 113 operates as described above to mitigate delay of media data packets over the packet network 112, providing a first output 117 of fixed length packets having identical lengths as compared to those transmitted by media content device 111. First output 117 is received by control unit 114, whereupon a control program operates to provide signal expansion and/or compression on the fixed length packets of first output 117, whereupon amended packets are stored and/or are transmitted as second output 118 to playout buffer 115. Playout buffer 115 acts upon second output 118 to provide third output 119, which is transmitted to playout means 116 for projection the a human recipient of the media content.

Figure 6:
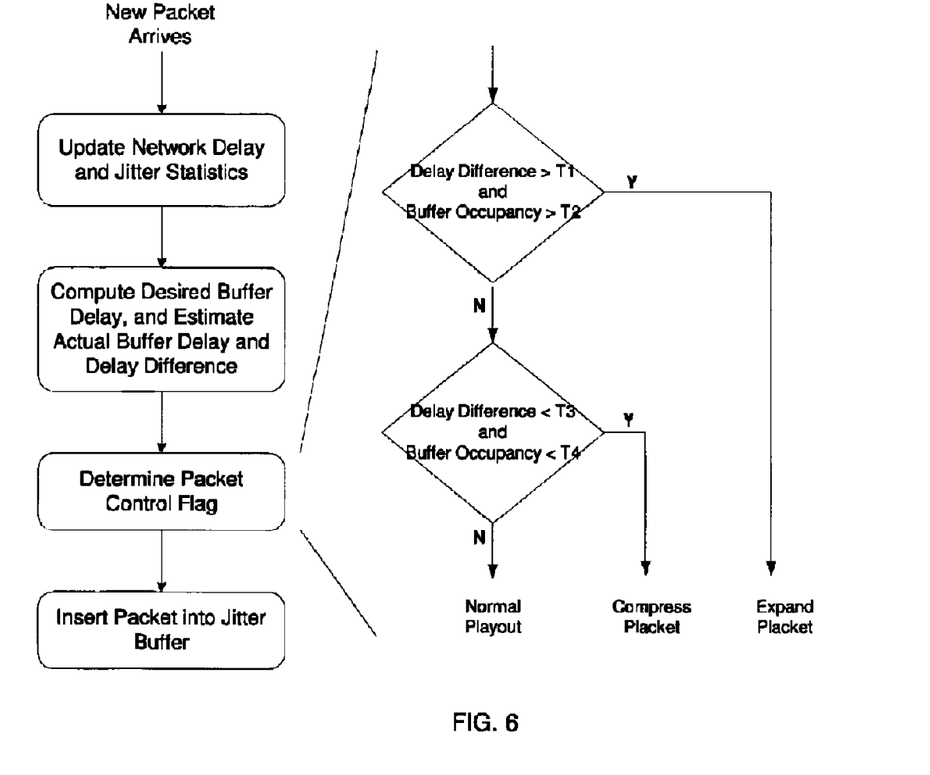
FIG. 6 is the flow diagram of the control process during packet arrival.
Figure 7:
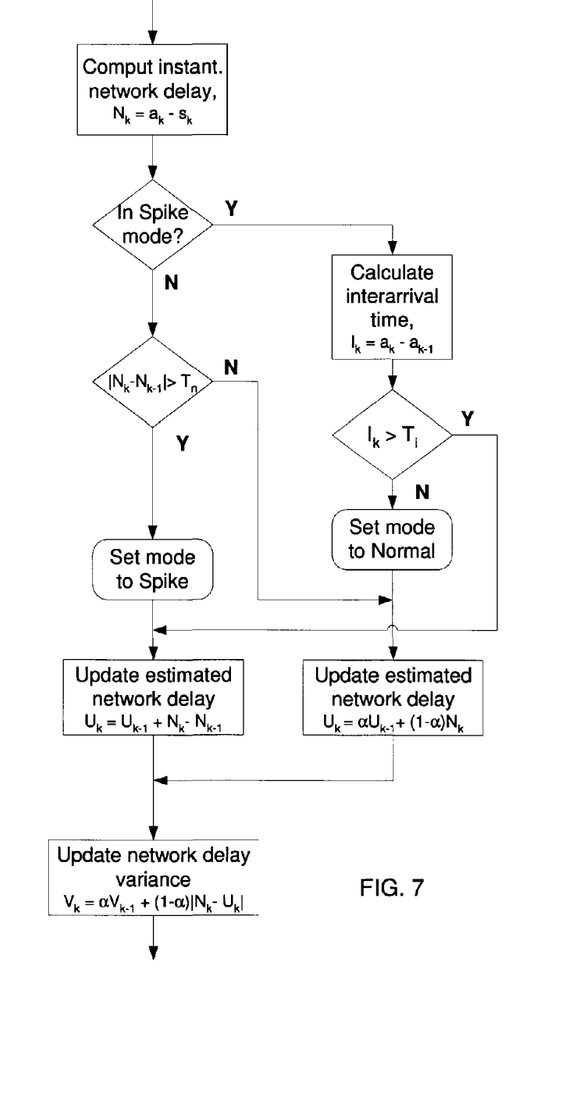
FIG. 7 is a diagram for calculation of network statistics.
Figure 8:
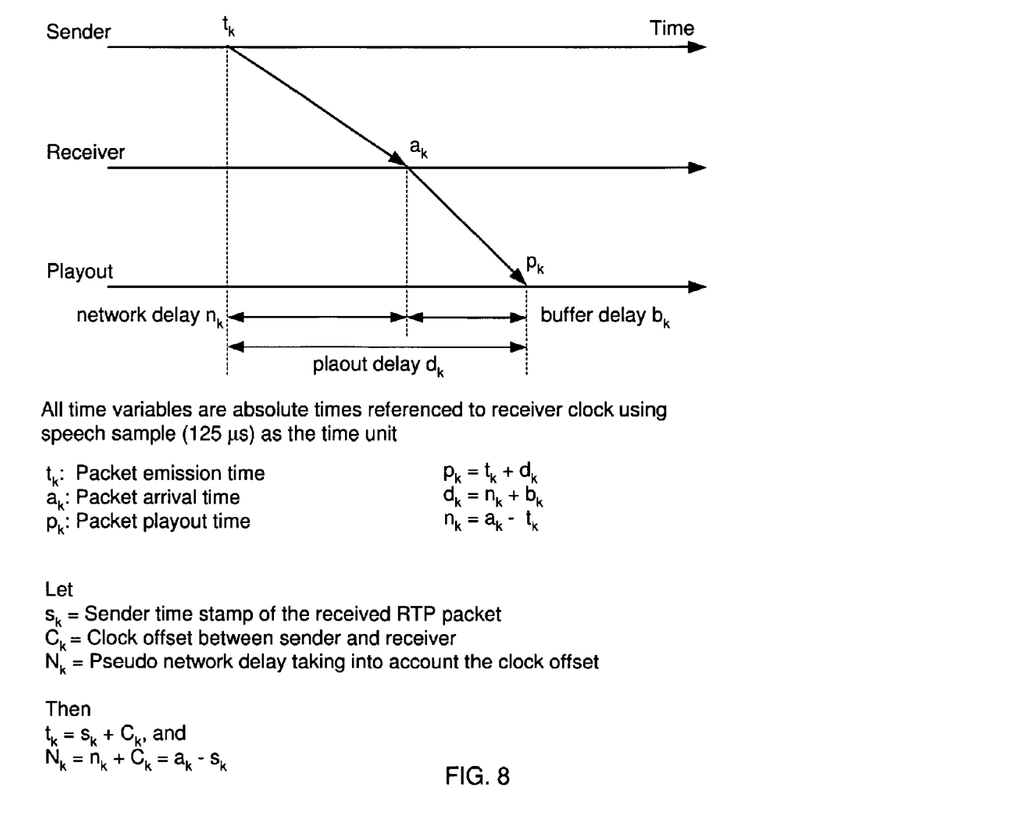
FIG. 8 is a diagram of the definitions and the relationship between the relevant delay variables.

The system, in a preferred embodiment, controls the jitter buffer and the playout buffer through the following process. FIG. 6 shows the flow diagram of the control process during packet arrival. When the system receives a new packet, it updates the network delay and jitter statistics using the packet's sender timestamp and arrival time, as shown in FIG. 7. The definitions and the relationship between the relevant delay variables are delineated in FIG. 8.

Referring to FIG. 7, the updating of the network delay statistic depends on whether the network is in the normal mode or the spike mode. In the normal mode of operation, the (pseudo) network delay U(k) is estimated by averaging the (pseudo) instantaneous network delay N(k), which is the difference between the arrival time and the sender time for the packet, as follows:

$$U(k)=aU(k-1)+(1-a)N(k)$$

where a is a parameter that determines the averaging time, whereas in the spike mode it is estimated as $$U(k)=U(k-1)+N(k)-N(k-1).$$

For both modes of operation, the variance V(k) of the network delay is updated as $$V(k)=aV(k-1)+(1-a)|N(k)-U(k)|$$

A spike mode is declared if the instantaneous pseudo network delay between consecutive packets exceeds a preset threshold Tn. The end of spike mode is detected when the arrival time difference between consecutive packets is less than a second preset threshold Ti. Again, FIG. 7 shows the signal flow and relevant computations in this regard.

After updating the network delay Uk and the variance V(k) statistics, the desired buffer delay b(k,desired) for an arriving packet is computed follows:

$$b(k,\text{desired})=d(k,\text{desired})-N(k)$$

where the desired playout delay d(k), desired is given by $$d(k,\text{desired})=U(k)+4V(k).$$

After computing the desired buffer delay b(k), desired, the actual buffer delay b(k), actual incurred by this packet is estimated based on the current fill level of the jitter buffer, assuming that no time scale modifications will be applied to the packets waiting ahead in the line to be played out:

$$b(k,\text{actual})=s(k)-s(k\text{HOL}).$$

Here, s(k) is the sender time stamp of the arriving packet and s(kHOL) is the sender time stamp of the head-of-line packet that is currently scheduled for playout. This is smoothed with a first-order filter to yield the filtered buffer delay $b(k)_{k:\text{filtered}}$ as follows:

$$b(k,\text{filtered})=ab(k-1 \text{ filtered})+(1-a)b(k,\text{actual})$$

where the parameter a determines the time constant of the filter. The difference between the filtered and desired buffer delays b(k), difference is given by $$b(k,\text{difference})=b(k,\text{filtered})-b(k,\text{desired})$$

This difference along with the current buffer occupancy is used to determine a packet control flag that indicates whether to expand or compress this packet upon playout, as illustrated in FIG. 6. When packets arrive faster than they are being played out the above delay difference will grow over time. If this difference and the current buffer occupancy exceed specific thresholds, designated as T1 and T2 in FIG. 6, packets are marked for time compression during playout. On the other hand, when packets arrive slower than they are played out, the delay difference will reduce over time. If this condition persists, and if the current buffer occupancy is too small, as determined by the thresholds T3 and T4, packets are marked for time expansion. The compression or expansion decision for a particular packet is reevaluated again when it is actually played out in order to account for the fact that time scale modifications may have been applied for other packets that were ahead in the jitter buffer. This ensures that unnecessary packet expansion or compression, which distorts the audio signal, is eliminated.

Figure 9:
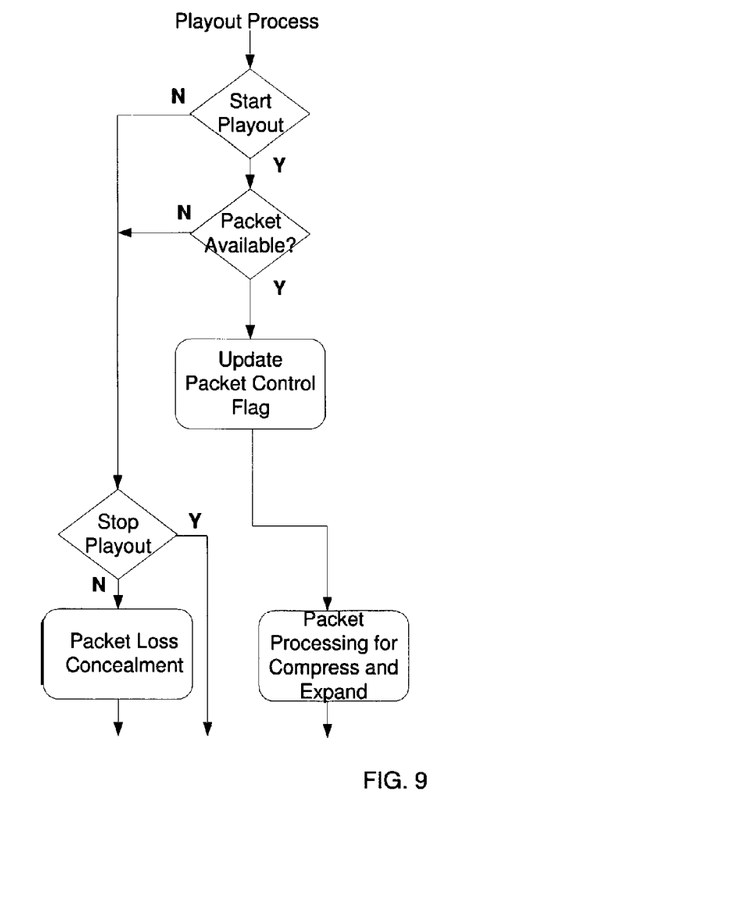
FIG. 9 is the flow diagram of the packet playout process.

The packet playout process is shown in FIG. 9. The start of playout process is determined by checking whether there is consistency in the arriving packets. When there is a packet to play, its packet control flag is updated with the latest jitter buffer condition before being sent to the signal processing unit that performs packet loss concealment, signal expansion or compression. The updating of the packet control flag in the playout process is performed with a different set of thresholds than the ones used in the packet arrival process. When there is no packet to play, the packet concealment procedure is invoked. The playout procedure will be halted when it is determined that there is a significant gap in the incoming packet stream.

The signal processing unit, in a preferred embodiment, includes processes for packet loss concealment, signal expansion and signal compression. Packet loss concealment is a special case of signal expansion, in which signal is expanded for at least a full packet length.

Signal tail expansion is a first embodiment of signal expansion in the system control unit 114. The control unit 115 includes means for identifying that, even after operation of the jitter buffer on packets received from the packet network 112a discontinuity has occurred in first output 117 equal to a first time period. The control unit 114 further includes means for decoding waveforms and making certain determinations concerning decoded waveforms of the fixed length packets of first output 117. Signal tail expansion appends signals to the end of the signals of a last packet received, i.e., the "tail", just before the discontinuity of the first time period to effectively fill the first time period or to extend a period of silence according to a predetermined algorithm. The recipient perceiving the playout of the filled-in discontinuity does not experience a perceived break in the media playout. A discontinuity in packets of first output 117 is also referred to herein as an expansion junction.

Figure 3:
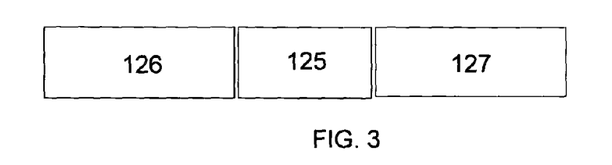
FIG. 3 is a block representation of an expansion junction delay or discontinuity between leading and trailing play sequence packets of a media stream.

FIG. 3 shows a visual representation of an audio stream discontinuity, i.e., expansion junction, in the control unit. Expansion junction 125 is shown between first waveform 126 (representing the decoded waveform of a leading packet of the first output delivered to the control unit) and a trailing second decoded waveform 127 (representing the decoded waveform of a packet next in line after the leading packet of the first output delivered to the control unit). In the prior art, expansion junction 125 in an ultimate playout would be perceived by a listener as an audible break in an audio stream from the media source. The expansion junction 125 is filled by signal tail expansion or its equivalent.

Signal tail expansion can be accomplished in a number of ways. In a specific example, Waveform Similarity overlap add method (WSOLA), a well-known and publicly available method, operates on an audio waveform to speed up or slow down a specific section of audio waveform, without pitch alteration (Waveform Similarity Overlap Add (WSOLA) algorithm, by W. Verhelst, M. Roelands, 1993) ("An Overlap-Add Technique 20 Based on Waveform Similarity (WSOLA) for High Quality Time-Scale Modification of Speech", IEEE Workshop on Signal Processing Systems, pp. 220-229, 1998, by W. Verhelst and M. Roelands).

Figure 4:
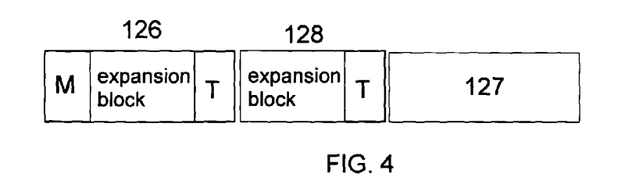
FIG. 4 is the block diagram of FIG. 3 showing an expansion block in place of the expansion junction of FIG. 3.

FIG. 4 shows a signal tail expansion 128 filling the expansion junction. Signal tail expansion 128 includes, in a specific example, a template block T of length (one to four milliseconds) is chosen at the end of the first signal waveform 126. This is compared with a previously decoded waveform at least one pitch period away (the maximum search window is about 140 samples for the slowest pitch period), and the block that matches it best (M) is found by correlation or average-magnitude-difference (AMDF) methods. (A variable gain term may be used to optimize the similarity comparison while using the AMDF method). Then, the waveform segment from the end of M followed by the template block T is appended as signal tail expansion 128 to the original signal waveform 126. This technique minimizes the discontinuity at the expansion junction, and completely eliminates the discontinuity as to signal waveform 127, since block T is repeated at the end of signal waveform 128 to fill the expansion junction.

Figure 5:
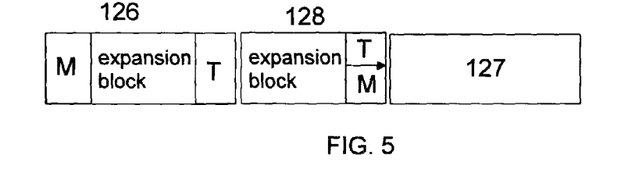
FIG. 5 is the block diagram of FIG. 3 showing an alternate form of an expansion block in place of the expansion junction of FIG. 3.

It is possible that T and M blocks matching falls below a pre-set requirement for minimum correlation measurement. In such a case, a control program detects the failure of matching criteria between T and M blocks and thereafter blends them, with fade-in and fade-out gains, as shown in FIG. 5 by way of well-known overlap and add (OLA) methods. Blending minimizes the effect of audio discontinuity.

Other methods are available for compensation for discontinuities between packets of a first output from the jitter buffer. For multiple tail expansions, it is not a good idea to simply repeat the expansion segment E+T since it produces unnatural harmonic artifacts. Instead, a template block T of suitable length is chosen at the end of the original signal waveform. This is compared with the previously decoded waveform at least one pitch period away, and the block that matches it best (call it M1) is found. Then, the waveform segment from the end of M1, including the template block T, is appended to the original waveform to yield the first expanded signal. This part is exactly the same as before. To perform a second expansion, a second matching block M2 that is two pitch periods away is found in a similar manner. The second expanded waveform now appends the segment E1-T-E2-MI-EI-T. This technique minimizes the discontinuity at the expansion junction, and completely eliminates the discontinuity with-a future waveform since-block T is repeated at the-end-of the expanded waveform. Again, if the match between T and M1 blocks is not very good, an OLA to blend these blocks is performed at the juncture to reduce the effect of the discontinuity.

Signal compression is needed when the jitter buffer is full, which implies that many future blocks are readily available while we are outputting a current speech block. The key idea is to delete a portion of the signal such that waveform discontinuities are minimized, i.e., compressing a waveform segment assuming matching blocks are found within a segment. If matching blocks are not found, as it happens during an unvoiced sound, signal compression should be avoided. In a specific example for compression of segment N (that is typically 10-30 ms in length), a template block T is chosen at the start of a segment N. Find the best matching block M within this segment. Form a compressed segment consisting of (OLA) blended T and M blocks and the block E2 following M. This compressed segment replaces the original segment. The block E1 prior to M is deleted in the output waveform. There is no waveform-discontinuity at the end of the compressed segment while the OLA operation minimizes the discontinuity at the beginning of the compressed segment.

Signal merging is to tail expand the current block as many times as needed and optionally head expand the future block and perform a maximum-correlation OLA to bridge the lost packet. The maximum-correlation OLA method stipulates that the shifting of the two waveforms should be adjusted to maximize the correlation (similarity) in the overlap region. The OLA is performed with fade-in and fade-out gains for the overlapped portions of the two waveforms. If there is no head expansion of the future packet then the OLA is performed on the tail end expansion of the current packet and the head end of the future packet. While performing an OLA the signals are shifted by an amount that yields the maximum correlation. This may result in a bridge waveform that is different in length than the missing packet.

The system, in a preferred embodiment, not only computes the desired buffer delay for a specific packet utilizing the measured network delay and jitter statistics but also estimates the actual buffer delay for that packet based on the fill level of the buffer at the time the packet arrives, and then evaluates an error signal that represents the difference between the two. It then applies the appropriate time scale modification (compression or expansion) to the played out speech packet so that the above mentioned difference is always driven towards zero. The receiver end only operation is very fast and closed loop. Prior art systems are known to employ open loop techniques that are not as efficient.

Figure 10:
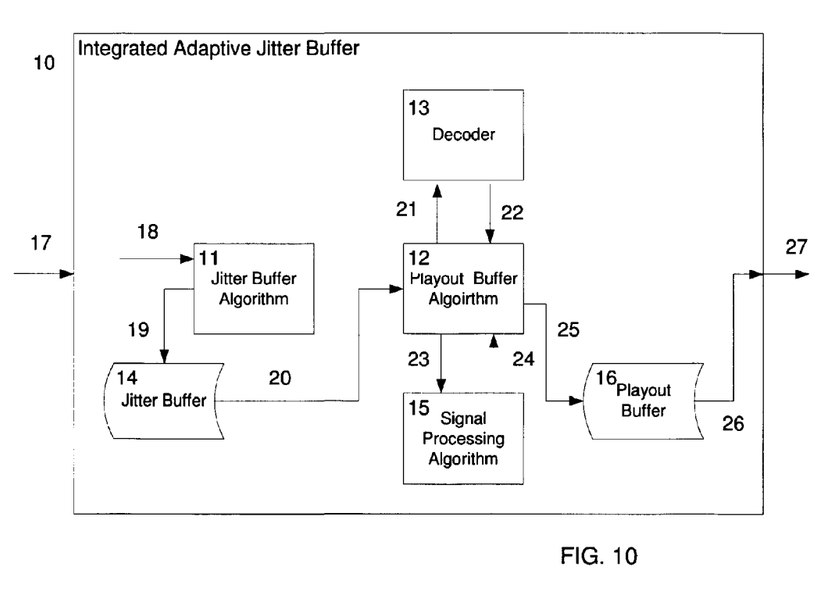
FIG. 10 is an alternate high level block diagram of the system.

FIG. 10 shows a block diagram of a high level flow diagram for the system. Media stream packet stream 17 is received by integrated adaptive jitter buffer and playout buffer means 10. Means 10 includes input 18 of the packets of stream 17. Input 18 is operated upon by jitter buffer algorithm means 11 using exchange stream 19 for storage in jitter buffer 14 for reducing network delay. As described above, for every arriving packet, the jitter buffer algorithm means 11 updates the network delay and jitter statistics and determines the desired buffer delay using these statistics, estimates the actual buffer delay for the packet based on the current buffer occupancy and computes the difference between the desired and estimated delays, marks the packet for compression or expansion if the delay difference and the buffer occupancy are outside specific bounds, and arranges an optimal sequence of packets for playout. Sequenced packets, including discontinuities and/or delays as exclusion junctions, are retrieved via step 20 by playout buffer algorithm means 12, and are transmitted via step 21 to decoder 13, which decodes coded packet data into waveforms and transmits the sequenced waveforms to playout buffer algorithm means 12 by step 22. As described above, playout buffer algorithm means 12 sends sequenced waveform via step 23 to signal processing algorithm means 15, which operates to conceal discontinuities, expand or compress the waveform signals based on the markings and a subsequent reevaluation of the latest jitter buffer condition. The processed waveform is sent to playout buffer algorithm means 13 via step 24; whereafter a playout buffer 16 receives the continuous waveform to playout buffer by exchange step 25. Playout buffer means 12 transmits by step 26 an output 27 to playout means for perception by a human recipient.

The system can be implemented in software, firmware, hardware, or a combination thereof. In techniques disclosed herein are intended to be non-limiting examples. A portion of the system may be implemented in software that is executed by a network, router or SIM phone processor. The software based portion of the system, which includes an ordered listing of executable instructions for implementing logical functions, can be embodied in any computer-readable medium for use by, or in connection with, an instruction execution system, apparatus, or device such as a computer-based system processor containing system, or other system that can fetch the instructions from the instruction execution system, apparatus, or device and execute the instructions. In the context of this document, a "computer-readable medium" can be any means that can contain, store, communicate, propagate or transport the program for use by or in connection with the instruction execution system, apparatus or device. The computer-readable medium can be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disk read-only memory (CD ROM) (optical). Note that the computer-readable medium could even be paper or another suitable medium upon which the program is printed, as the program can be electronically captured, via for instance, optical scanning of the paper or other medium, then compiled, interpreted or otherwise processed in a suitable manner, if necessary, and then stored in a computer memory.

The above description discloses to one skilled in the art many equivalent options that those specifically stated as to structure and/or methods to accomplish the techniques disclosed herein.

What is claimed is:

1. A system comprising:
  a first buffer;
  an interface configured to receive a first packet from a network;
  a processor configured to
    determine a first delay of the network in transmitting the first packet,
    prior to storing the first packet in the first buffer, determine (i) first statistics of the first buffer, and (ii) an amount the first buffer is filled,
    determine a predetermined delay of the first buffer for the first packet based on (i) the first delay of the network, and (ii) the first statistics of the first buffer,
    estimate an actual delay of the first buffer for the first packet based on the amount the first buffer is filled,
    generate an error signal based on the predetermined delay and the actual delay, and
    based on the error signal, one of compress and expand the first packet to change a first length of the first packet to a second length; and
  a output device configured to output the first packet based on the second length.

2. The system of claim 1, wherein the processor is configured to (i) store the first packet in the first buffer, (ii) subsequent to storing the first packet in the first buffer, determine second statistics of the first buffer, and (iii) based on the error signal and the second statistics, one of compress and expand the first packet to change the length of the first packet from the first length to the second length.

3. The system of claim 1, wherein:
  the interface is configured to receive a sequence of packets;
  the sequence of packets includes the first packet;
  the processor is configured to
    for each packet in the sequence of packets, update the first delay of the network and the first statistics, update the predetermined delay of the first buffer based on the updated first delay of the network and the updated first statistics, for each packet in the sequence of packets, update the actual delay of the first buffer, generate the error signal based on the updated predetermined delay and the updated actual delay, and compress or expand selected ones of the packets in the sequence of packets based on the error signal; and the output device is configured to output the packets in the sequence of packets based on results of the compression or expansion of the selected ones of the packets in the sequence of packets.

4. The system of claim 1, wherein:

the processor is configured to mark the first packet for one of compression or expansion based on a difference between the predetermined delay and the actual delay; and the output device is configured to output the first packet based on the marking of the first packet.

5. The system of claim 1, wherein:

the interface is configured to receive a first sequence of packets;

the sequence of packets includes (i) the first packet, and (ii) packets of having different lengths;

the processor is configured to generate a second sequence of packets by (i) modifying lengths of selected ones of the packets in the first sequence of packets, (ii) modifying an order of the packets in the first sequence of packets, and (iii) compressing or expanding selected ones of the packets in the second sequence of packets;

the packets in the second sequence of packets each have a same length; and the output device is configured to output the second sequence of packets based on results of the compression or expansion of the selected ones of the packets in the second sequence of packets.

6. The system of claim 5, wherein:

the processor is configured to store (i) the first sequence of packets in the first buffer, and (ii) the results of the compression or expansion of the selected ones of the packets in the second sequence of packets in a second buffer; and the output device is configured to output the results of the compression or expansion of the selected ones of the packets in the second sequence of packets from the second buffer.

7. The system of claim 5, further comprising a decoder configured to decode the second sequence of packets prior to the compression or expansion of the selected ones of the packets in the second sequence of packets.

8. The system of claim 7, wherein:

the decoder is configured to decode the second sequence of packets to generate a signal output;

the signal output includes a period void of audio data;

the period void of audio data is between a first waveform and a second waveform;

the processor is configured to sample at least one of the first waveform and the second waveform to generate a block of audio data, and fill the period void of audio data with the block of audio data to generate an expanded output; and the output device is configured to output the expanded output.

9. The system of claim 7, wherein:

the decoder is configured to decode the second sequence of packets to generate a signal output;

the signal output includes a period void of audio data;

the period void of audio data is between a first waveform and a second waveform;

the processor is configured to sample at least one of the first waveform and the second waveform to (i) remove matching blocks of data in the signal output, and (ii) generate a compressed output; and the output device is configured to output the compressed output.

10. The system of claim 1, wherein:

the interface is configured to receive a sequence of packets;

the sequence of packets includes the first packet;

the processor is configured to detect absence of a packet in the sequence of packets prior to output of the packets in the sequence of packets as stored in the output device, generate a message based on the absence of the packet, and generate a block of audio data based on the message; and the output device is configured to output the packets in the sequence of packets to include the block of audio data.

11. The system of claim 1, wherein:

the interface is configured to receive a sequence of packets;

the sequence of packets includes the first packet;

the processor is configured to detect clock skew associated with the sequence of packets based on (i) the first statistics, and (ii) prior to output of the packets in the sequence of packets as stored in a second buffer, generate one of a first message and a second message based on the clock skew, generate a signal output to include (i) the packets in the sequence of packets, and (ii) one of the first message and the second message, generate a block of audio data based on the first message, and remove matching blocks of data in the second buffer based on the second message; and the output device is configured to output the packets in the sequence of packets based on one of (i) the block of audio data, and (ii) the removal of the matching blocks of data.

12. The system of claim 1, further comprising a decoder configured to generate decoded waveforms based on an output of the first buffer, wherein:

the processor is configured to calculate a first difference between the predetermined delay of the first buffer and an average delay of the first buffer; and the output device is configured to expand output of the decoded waveforms when the difference exceeds a first predetermined value and the current fill level of the first buffer is less than a second predetermined value, and compress output of the decoded waveforms when the difference is less than the first predetermined value and the current fill level exceeds the second predetermined value.

13. The system of claim 1, wherein the processor is configured to:

store a first message or a second message with the first packet in the first buffer;

generate a signal output to include (i) the first packet, and (ii) based on the first statistics, one of the first message and the second message; and expand and compress the signal output based on one of the first message and the second message.

14. The system of claim 1, wherein the first statistics comprise at least one of:
   a latency between the first packet and a second packet;
   a packet loss per a predetermined period of time;
   a delay of the first buffer; or
   the current fill level of the first buffer.

15. The system of claim 1, wherein the first statistics comprise:
   a latency between the first packet and a second packet;
   a packet loss per a predetermined period of time;
   a delay of the first buffer; and
   the current fill level of the first buffer.

16. The system of claim 1, wherein:
   prior to decoding the first packet, the processor is configured to
      during a first period, determine a first difference between a first delay of the first buffer and the predetermined delay,
      generate a first message when at least one of
         the difference is less than a first threshold, and
         the current fill level of the first buffer is less than a second threshold, and
      generate a second message when at least one of
         the difference is greater than a third threshold, and
         the current fill level is greater than a fourth threshold; and
   the output device is configured to expand or compress the first packet based on one of the first message and the second message.

17. The system of claim 16, wherein subsequent to decoding the first packet, the processor is configured to:
   during a second period, determine a second difference between a second delay of the first buffer and the predetermined delay; and
   one of expand and compress the first packet based on the second delay and the second difference.

18. The system of claim 1, wherein:
   the interface is configured to receive a sequence of packets;
   the sequence of packets include the first packet; and
   the processor is configured to
      based on the first statistics, generate a first signal output including (i) the packets in the sequence of packets, and (ii) one of a first message and a second message,
      decode the first signal output to generate a second signal output,
      determine second statistics of the first buffer subsequent to the decoding of the first signal output, and
      based on the one of the first message and the second message and the second statistics of the first buffer, at least one of (i) conceal discontinuities in the second signal output, or (ii) expand or compress the second signal output.

19. The system of claim 1, wherein:
   the processor is configured to
      operate in a first mode and in a second mode,
      during the first mode, estimate a second delay of the network based on (i) the first delay of the network, (ii) a first instantaneous delay of the network, and (iii) a second instantaneous delay of the network,
      during the second mode, estimate the second delay of the network based on (i) the first delay of the network, (ii) the first instantaneous delay of the network, and (iii) an average time,
      determine a delay variance of the network based on whether the processor is operating in the first mode or the second mode, and
      determine a delay of the first buffer based on the first delay of the network and the delay variance of the network; and
   the first statistics include the delay of the first buffer.

20. The system of claim 19, wherein:
   the processor is configured to
      store the first packet in a second buffer based on the second length,
      determine the predetermined delay of the first buffer based on (i) a predetermined delay of the second buffer, and (ii) the first instantaneous delay, and
      determine the predetermined delay of the second buffer based on (i) the second delay of the network, and (ii) the delay variance of the network; and
   the output device is configured to output the first packet from the second buffer based on the delay of the second buffer.

* * * * *